US011244770B2

(12) United States Patent
Sempere Belda et al.

(10) Patent No.: US 11,244,770 B2
(45) Date of Patent: Feb. 8, 2022

(54) METHOD OF DECONTAMINATING A METAL SURFACE IN A NUCLEAR POWER PLANT

(71) Applicant: Framatome GmbH, Erlangen (DE)

(72) Inventors: Luis Sempere Belda, Erlangen (DE); Christian Topf, Forchheim (DE)

(73) Assignee: FRAMATOME GMBH, Erlangen (DE)

( * ) Notice: Subject to any disclaimer, the term of this patent is extended or adjusted under 35 U.S.C. 154(b) by 574 days.

(21) Appl. No.: 16/310,498

(22) PCT Filed: Jun. 28, 2018

(86) PCT No.: PCT/EP2018/067362
§ 371 (c)(1),
(2) Date: Dec. 17, 2018

(87) PCT Pub. No.: WO2019/007788
PCT Pub. Date: Jan. 10, 2019

(65) Prior Publication Data
US 2021/0225544 A1 Jul. 22, 2021

(30) Foreign Application Priority Data
Jul. 6, 2017 (DE) ...................... 10 2017 115 122.2

(51) Int. Cl.
*G21F 9/00* (2006.01)
*G21C 17/022* (2006.01)
*G21F 9/12* (2006.01)
*G21F 9/30* (2006.01)

(52) U.S. Cl.
CPC .......... *G21F 9/004* (2013.01); *G21C 17/0225* (2013.01); *G21F 9/12* (2013.01); *G21F 9/30* (2013.01)

(58) Field of Classification Search
CPC ... G21F 9/00; G21F 9/004; G21F 9/12; G21F 9/30; G21C 17/0225
USPC ........................................................ 588/20
See application file for complete search history.

(56) References Cited

U.S. PATENT DOCUMENTS

| 5,045,273 A | 9/1991 | Gassen et al. |
| 6,169,221 B1 | 1/2001 | Milner et al. |
| 6,613,153 B1 | 9/2003 | Bertholdt et al. |
| 9,502,146 B2 | 11/2016 | Bertholdt et al. |
| 2006/0167330 A1 | 7/2006 | Enda et al. |
| 2014/0338696 A1 | 11/2014 | Berthold et al. |

FOREIGN PATENT DOCUMENTS

| DE | 2847780 A1 | 5/1980 |
| DE | 19818772 C2 | 5/2000 |
| EP | 0355628 A1 | 2/1990 |
| EP | 1220233 B1 | 1/2010 |
| EP | 2787509 B1 | 12/2015 |
| GB | 2077482 A | 12/1981 |
| GB | 2044982 B | 10/1982 |
| JP | H09113690 A | 5/1997 |
| JP | 2002247807 A | 8/2002 |
| JP | 2014092442 A | 5/2014 |

OTHER PUBLICATIONS

PCT International Search Report and Written Opinion dated Sep. 12, 2018 in Application No. PCT/EP2018/067362, 12 pages.

*Primary Examiner* — Edward M Johnson
(74) *Attorney, Agent, or Firm* — Dilworth IP, LLC (57) ABSTRACT

A method of decontaminating a metal surface located on a component within a nuclear plant, in particular within the cooling system of a nuclear power plant, which is covered with a metal oxide layer containing radioactive substances, the method including a decontamination step in which a metal oxide layer pretreated in an oxidation step is contacted with an aqueous solution of an organic acid to dissolve the metal oxide layer, forming a decontamination solution containing the organic acid, metal ions and the radioactive substances, and passing the decontamination solution over an ion exchanger to immobilize metal ions and radioactive substances. An oxidant selected from oxygen, air, hydrogen peroxide and ozone is dosed into the decontamination solution to control the dissolution rate of the metal oxide layer. The method is particularly suitable for large-scale system decontamination and ensures high process stability.

26 Claims, 3 Drawing Sheets

METHOD OF DECONTAMINATING A METAL SURFACE IN A NUCLEAR POWER PLANT

FIELD OF THE INVENTION

The invention relates to a method of decontaminating a metal surface exposed to a radioactive fluid during the operation of a nuclear plant. In particular, the invention relates to a method of decontaminating a metal surface located within a component of the nuclear plant, especially in a coolant circuit of a nuclear reactor, wherein the metal surface is covered with a metal oxide layer containing radioactive substances.

BACKGROUND

Nuclear reactors comprise a reactor vessel in which fuel elements containing nuclear fuel are located. A tube system forming a coolant circuit which is linked with at least one coolant pump and, in the case of a pressurized water reactor (PWR) or heavy water reactor, with a steam generator, is connected to the reactor vessel.

Usually, the tube system of the coolant circuit consists of austenitic FeCrNi stainless steels. The heat exchanger surfaces of the steam generators can be made of Ni alloys. In addition, cobalt steels and/or cast materials are used for coolant pumps and other parts. Under power operation conditions of a nuclear reactor all these materials exhibit a certain solubility in water. Metal ions dissolved from the alloys are conveyed by the coolant flow into the reactor vessel where they are partly converted into radioactive nuclides by the neutron radiation prevailing therein. The nuclides, in turn, are distributed in the entire coolant system by the coolant flow and become deposited in oxide layers forming on the metal surfaces of the coolant system during the operation of the nuclear reactor.

As the operating time increases, the amount of activated nuclides deposited accumulates, increasing the radioactivity and dose rate at the parts of the coolant system. Depending on the type of alloy used for a part, the oxide layers contain, as main constituent, iron oxide with di- and trivalent iron as well as oxides of other metals such as chromium and nickel that can be present as alloy constituents.

Prior to being able to perform control, maintenance, repair or dismantling measures at the parts of the reactor systems, a reduction of the radioactive radiation of the respective parts or components is required according to the ALARA principle ("as low as reasonably achievable") to reduce the radiation exposure for the personnel. This is accomplished by removing the oxide layer present on the surfaces of the parts as completely as possible by means of a decontamination method. Decontamination can be performed as full system decontamination (FSD) or as large-scale system decontamination including a subsystem or component decontamination. To this end, either the entire coolant system or a section of the system separated by valves is filled with an aqueous cleaning solution and decontaminated.

From EP 1 220 233 B1 a chemical decontamination method is known in which an oxide layer attached to a contaminated part is dissolved. To perform the decontamination method a decontamination solution is provided that contains an organic acid such as oxalic acid. The decontamination solution is treated electrolytically to reduce Fe(III) ions in the decontamination solution cathodically and/or to oxidize Fe(II) ions anodically to form Fe(III) ions. Valency and concentration of the iron ions are adjusted such that the corrosion potential of the stainless steel part remains in a passivated state to prevent the part from base metal attack and corrosion.

From U.S. Pat. No. 6,613,153 B1 a decontamination method is known in which initially an oxide layer is completely removed from a metal part by means of a decontamination solution. As in this decontamination step the corrosion potential is about 200 mV as compared to a saturated silver/silver chloride reference electrode, no base metal attack occurs. Subsequently, the Fe(III) complexes present in the decontamination solution are broken down by UV treatment and removed from the solution, reducing Fe(III) to form Fe(II). By removing the Fe(III) ions from the decontamination solution the corrosion potential of the solution decreases to about −300 mV allowing a base metal attack to occur. As a result of the base metal attack a metal layer containing a radionuclide is removed from the metal part. By adding an oxidant such as hydrogen peroxide the corrosion potential can again be increased to about 200 mV and the base metal attack can be stopped.

U.S. Pat. No. 6,169,221 B1 describes a decontamination method in which a radioactively contaminated metal layer is treated with a decontamination solution containing an organic acid and an oxidant. The decontamination solution is reacted with the contaminated metal layer at a pH of up to 4.5. Subsequently, the metal ions and radioactive substances contained in the solution are precipitated and separated from the solution. Formic acid, acetic acid, trifluoroacetic acid, citric acid and oxalic acid can be used as an organic acid. The oxidant can be hydrogen peroxide.

The decontamination methods known are well suitable for decontaminating parts of the coolant system of a nuclear power plant in separate decontamination vessels. Due to the high volumes of the systems to be treated full system decontamination (FSD) or large-scale decontamination require very long treatment periods as compared to the available capacity of the power plant's own ion exchangers. In this case, additional ion exchangers and other components in the form of temporary external decontamination facilities are usually used. However, for reasons of costs, it is desired to be able to decontaminate the complete coolant systems with little monitoring effort and means provided by the power plant without using additional external ion exchangers.

Moreover, it has been found that, when decontaminating single power plant facilities, an unexpected sharp increase in the ion input into the decontamination solution occurred during the decontamination step, resulting in a premature exhaustion of the capacity of the power plant's own ion exchanger facilities. Furthermore, in this case, the oxide layer can flake off in some areas, exposing the underlying metal surface. The exposed metal surface is then exposed to undesired corrosion by a base metal attack, which additionally accelerates the input of metal ions into the decontamination solution. The oxide flakes detached from the metal surface can accumulate in low-flow zones of the coolant system, forming so-called "hot spots" with increased radioactivity, which can only be removed from the coolant system with considerable additional effort and are a danger for the operating personnel.

If the metal ion concentration in the decontamination solution rises too fast, this can also result in exceeding the solubility limit of poorly soluble salts at the process temperature and in forming precipitates in the decontamination solution in which radioactive substances present in the decontamination solution may accumulate. These radioactively contaminated precipitates may also accumulate and become deposited in low-flow areas in the coolant system, forming radioactive "hot spots".

It is thus an object of the invention to provide a method of decontaminating a metal surface in a nuclear plant, in particular a metal surface in the coolant circuit of a nuclear power plant and in the connected auxiliary systems, allowing for a reliable process control even in the case of large system volumes, especially in the context of a large-scale system decontamination or a full system decontamination (FSD), and allowing for the decontamination to be performed, to a large extent, by using ion exchangers and other components provided by the plant.

To solve the object a method of decontaminating a metal surface is provided, wherein the metal surface is located on a component within a nuclear plant, in particular within the cooling system of a nuclear power plant, wherein the metal surface is covered with a metal oxide layer containing radioactive substances and wherein the method comprises the following steps:

a) an oxidation step in which the metal oxide layer is contacted with an aqueous oxidation solution comprising an oxidant;

b) a decontamination step wherein the metal oxide layer treated in the oxidation step is contacted with an aqueous solution of an organic acid having up to six carbon atoms to dissolve the metal oxide layer to form a decontamination solution which contains the organic acid as well as metal ions and the radioactive substances, and wherein the decontamination solution is passed over an ion exchanger to immobilize the metal ions and the radioactive substances;

wherein in step b) an oxidant of the group consisting of oxygen, air, hydrogen peroxide and ozone is dosed into the decontamination solution.

The inventors have discovered that the sharp increase in the metal ion input from the metal oxide layer during the decontamination step of the large-scale system decontamination is due to an oxygen depletion in the decontamination solution. The Fe(II) ions present in the decontamination solution react with oxygen to form Fe(III) ions which, in turn, are reduced by the organic acid contained in the decontamination solution to form Fe(II) ions. As a result, the organic acid is catalytically oxidized by oxygen.

Due to the high system volumes very long treatment periods are required for a large-scale system decontamination such as a full system decontamination (FSD). These are sufficient for the catalytic oxidation of the organic acid proceeding very slowly to result in a complete reaction of the oxygen contained in the decontamination solution.

Surprisingly, it could also be shown that the dissolution rate of the metal oxide layer increases as the oxygen content of the decontamination solution decreases. Thus, the sharp increase in the metal ion input into the decontamination solution could be associated with the oxygen depletion.

According to the present invention, it is proposed to introduce an oxidant into the decontamination solution as early as during the decontamination step to compensate for the oxygen depletion in the decontamination solution occurring during the long cycle periods of the decontamination step, and, in particular, to control the dissolution rate of the oxide layer and keep it below a plant-specific limit value. Control of the dissolution rate of the metal oxide layer makes it possible to use the power plant's own ion exchanger facilities without relying on external ion exchangers. Moreover, the ion load in the decontamination solution reduced by the oxidant addition results in the solubility of the metal ions released from the metal oxide layer not being exceeded.

According to the invention, the added oxidant is selected from the group consisting of oxygen, air, hydrogen peroxide and ozone. As these oxidants do not produce any secondary waste, no additional radioactive substances have to be disposed of.

Another advantage of the decontamination method of the present invention is that Ni(II) ions can be preferably and selectively removed from the decontamination solution as compared to the iron ions contained in the decontamination solution. This is accomplished by the oxidant oxidizing the Fe(II) ions contained in the decontamination solution to form Fe(III) ions, which, in turn, form anionic complexes with the organic acid and thus do not compete with the Ni(II) cations for free sites at the ion exchanger material. The preferred removal of the nickel ions ensures that the solubility limit of poorly soluble nickel salts such as poorly soluble nickel oxalate is not exceeded at the common process temperatures and thus no undesired precipitates may occur in the decontamination solution.

Further, control of the oxide dissolution rate by oxidant dosing has the effect that less nickel per time unit enters the decontamination solution, thus keeping the concentration of the nickel ions in the decontamination solution low.

The dosing of the oxidant and the dissolution rate of the oxide layer can be controlled and monitored by means provided by the power plant. This also allows for a full system decontamination to be performed without extensive external process control. The dissolution rate of the metal oxide layer can be ascribed empirically to a physical or electrochemical parameter of the decontamination solution, for example to the reduction-oxidation potential, the corrosion potential, the total oxygen content of the solution and/or the conductivity. This allows for the process management to be indirectly monitored and for the oxidant addition to the decontamination solution to be controlled by simple means.

Finally, the decontamination method of the present invention allows the continued use of oxalic acid and other aliphatic mono- and polycarboxylic acids as decontaminating agents even during large-scale system decontamination. Aliphatic carboxylic acids such as oxalic acid have proven to be very safe and only slightly toxic decontamination agents, which can be removed from the decontamination circuit almost without producing any waste, forming carbon dioxide and water, and thus contribute to the prevention of radioactive secondary waste.

BRIEF DESCRIPTION OF THE DRAWINGS

Further advantages and features of the invention will become apparent from the following description of preferred embodiments in conjunction with the attached drawing in which.

DETAILED DESCRIPTION

By using the decontamination method of the present invention radioactively contaminated oxide layers are reliably removed from the metal surfaces located on components of a nuclear plant, in particular in the coolant system of a nuclear reactor, without attacking the metal surfaces themselves.

The decontamination method of the present invention can be used for all nuclear plants exposed to a contact with radioactive fluids, in particular gases and liquids, during their operation. In this sense, nuclear plants are in particular fuel element processing plants and nuclear power plants.

Figure 1:
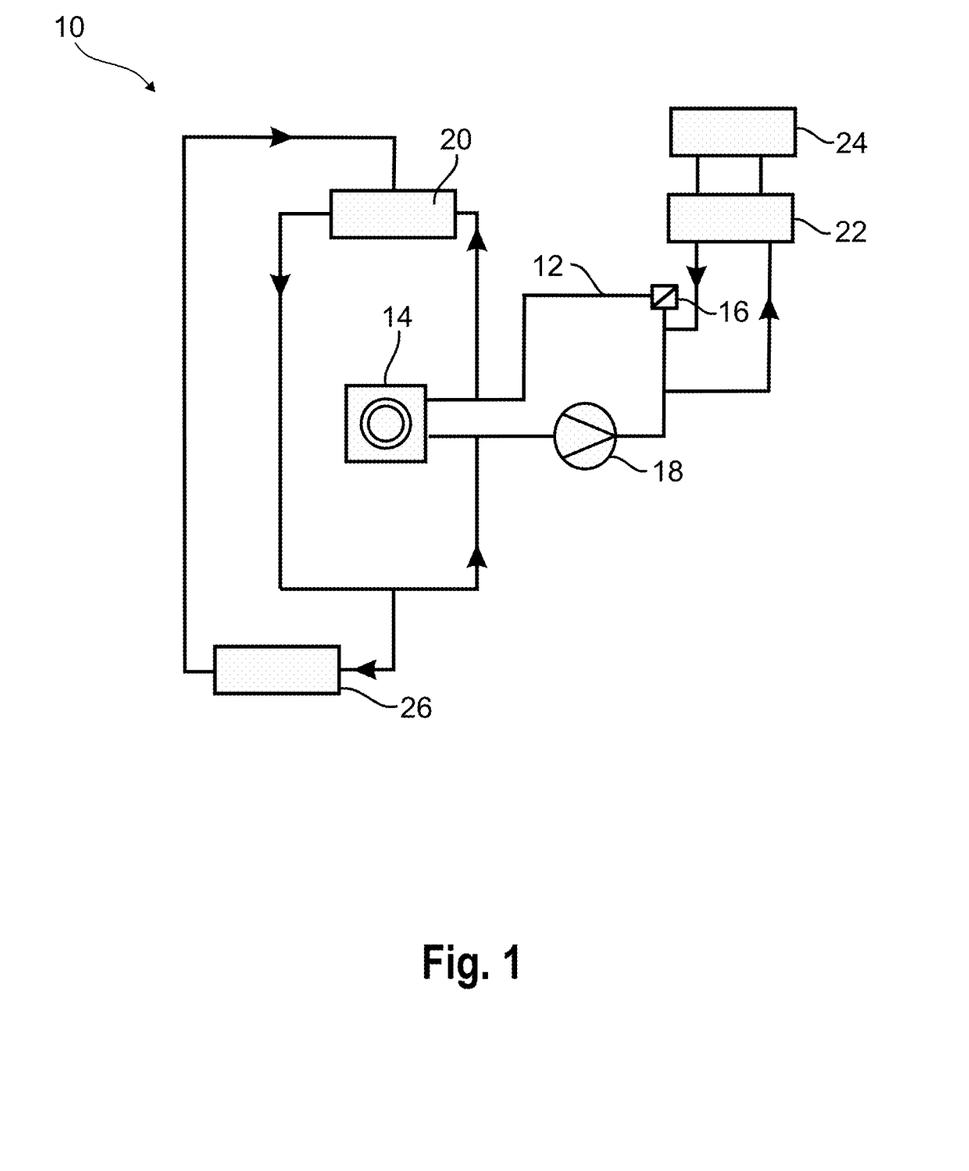
FIG. 1 is a schematic diagram of the coolant system of a nuclear reactor.

The following description of the method of the present invention relates to the decontamination of metal surfaces in the coolant system of a nuclear power plant without being limited to that. FIG. 1 is a schematic diagram of the coolant system 10 of a nuclear reactor for a nuclear power plant in which the primary coolant is circulated through the reactor pressure vessel 14 connected to the coolant circuit 12 and the steam generator 16. In the coolant circuit 12 the main coolant pump 18 is provided serving to circulate the primary coolant and/or the decontamination solution in the decontamination step. Instead of one main coolant pump 18 several main coolant pumps may be operated.

Additionally, the emergency cooling and residual heat removal system 20 with the corresponding pumps (not shown) is connected to the coolant circuit 12. Further, the coolant system 10 comprises a volume control system 22 and a reactor water purification system 24, which are also connected to the coolant circuit.

The waste heat generated by the coolant pumps 18 can be used to bring the decontamination solution to the desired reaction temperature.

Although only one loop of the coolant circuit 12 is shown in FIG. 1, it can be assumed that the decontamination method of the present invention can also be used in nuclear reactors having a coolant system with two or more loops of the coolant circuit 12.

In particular, the nuclear reactor can be built as a pressurized water reactor, a boiling water reactor or a heavy water reactor.

In addition, an external decontamination facility 26 can be connected to the coolant circuit 12 and/or the emergency cooling and residual heat removal system 20. Preferably, the decontamination facility 26 has a modular structure and can be equipped with a UV reactor, one or several pumps, heaters, ion exchangers, filters, sampling devices, monitoring equipment, remote access and automation systems and chemical dosing systems.

The UV reactor is preferably provided for the photocatalytic decomposition of the organic acid during a purification step following the decontamination step. The sampling systems serve to control the process during the treatment cycles. Optionally, mechanical filtration of the decontamination solution may be performed using the filter devices.

The external decontamination facility 26 can be connected to various components and at several sites of the coolant system, depending on the design of the external decontamination facility and the configuration of the coolant system to be decontaminated or its components.

The configuration of the coolant system 10 shown in FIG. 1 can vary and is not to be understood as limiting with respect to the present invention.

The decontamination method of the present invention is preferably suitable for large-scale system decontamination. Thus, according to a first embodiment of the invention, the component of the coolant system to be decontaminated comprises at least the pipelines for the primary coolant, the reactor pressure vessel, the coolant pumps, the steam generator, the pressure reduction facility and/or the auxiliary systems such as the emergency cooling and residual heat removal system connected to the coolant system, the volume control system or the reactor water purification system, or several of the components mentioned.

It is particularly preferred to use the decontamination method of the present invention for a full system decontamination (FSD) in which the radioactively contaminated oxide layer is removed from the metal surfaces of all components of the coolant systems being in contact with the primary coolant during power operation of the nuclear reactor.

According to the invention, a system volume starting from 15 $m^3$, preferably 30 $m^3$, and/or a system surface to be decontaminated starting from 500 $m^2$, preferably 1000 $m^2$, requires a large-scale system decontamination. With system volumes and system surfaces above this magnitude, an oxygen depletion of the decontamination solution can be expected to occur during decontamination, which cannot be reliably compensated by environmental influences.

It is particularly preferred that the system volume to be decontaminated is at least 90 $m^3$. However, in full system decontamination (FSD), system volumes can be 300 $m^3$ and more.

In large-scale system decontamination or full system decontamination (FSD), the ion exchangers used in the decontamination step to immobilize the metal ions and radioactive substances preferably have a flow capacity of at least 10% of the entire system volume to be decontaminated per hour, in particular a flow capacity of at least 10 to 20% of the entire system volume per hour. Particularly preferably, only the ion exchangers of the power plant's own reactor water purification system are used in the decontamination step.

By connecting an external treatment facility the flow capacity of the ion exchangers can be increased to more than 30% of the entire system volume per hour, preferably to more than 100% of the entire system volume per hour. Although the additional use of the external decontamination facility can considerably reduce the duration of the decontamination step, it results in a higher technical effort and higher costs.

The flow capacity of the ion exchangers denotes the volume throughput of the decontamination solution per hour.

The smaller the flow capacity of the ion exchangers at a given available system volume in the decontamination step, the more oxidant is dosed into the decontamination solution to slow down the dissolution rate of the metal oxide layer and to adapt the amount of metal ions entering the decontamination solution to the flow capacity of the available ion exchangers.

The ratio of the flow capacity of the ion exchangers to the system volume to be decontaminated is referred to as purification rate. Preferably, during the decontamination step, the purification rate is in a range of between 0.1 $h^{-1}$ and 0.7 $h^{-1}$. The purification rate can also be used as a measure for the amount of oxidant dosed into the decontamination solution during the decontamination step.

The metal surface of the components in the coolant system 10 covered with an oxide layer can be decontaminated in one or more treatment cycles comprising at least an oxidation step, a decontamination step and optionally a purification step and/or further treatment steps.

Below, the individual steps of the decontamination method of the present invention are explained in more detail.

Oxidation Step

Step a) of the decontamination method of the present invention corresponds to an oxidation step of the applications known in the prior art used for oxidative pretreatment and decomposition of the poorly soluble metal oxide layer. In this step, no considerable dissolution of the metal oxide layer occurs. Only the chromium contained in the metal oxide layer and a small amount of other metals pass into the oxidation solution. Especially the iron present in the metal oxide layer is not dissolved in the oxidation step, but only oxidized in the solid state to form trivalent iron.

To perform the oxidation step an oxidant is introduced into the primary coolant in the coolant circuit 12, forming an oxidation solution, and the oxidation solution is circulated in the coolant circuit 12 to bring the oxidation solution in contact with the metal surface. The oxidant can be introduced into the primary coolant by using the external decontamination facility 26 or the power plant's own volume control system 22.

For circulation of the oxidant solution at least the main coolant pump 18 and/or further coolant pumps present in the coolant system 10, serving at the same time as a heat source, may be used.

$Ce^{4+}$, permanganates such as permanganic acid and its alkali metal salts, $H_2S_2O_8$ and its salts and ozone ($O_3$) can be used as an oxidant. According to a preferred embodiment, the oxidant is a permanganate, preferably permanganic acid. Permanganates are easily available and have already been technically proven as an oxidant for decontamination methods The concentration of the oxidant in the oxidation solution is preferably in the range of between 10 and 800 mg/L, preferably in the range of 100 to 300 mg/L.

Usually, the oxide layers deposited on the metal surface contain Cr(III), Fe(II) and Fe(III) as well as Ni(II) in a poorly soluble spinel structure. Due to their contact with the oxidant, Cr(III) and Fe(II) contained in the oxide layer on the metal surface are oxidized to form Cr(VI) and Fe(III), thus breaking down the spinel structure of the layer. In this process, permanganate ($MnO_4^-$) employed as an oxidant is reduced to form manganese dioxide ($MnO_2$). While, in this phase, Cr(VI) passes into solution as a readily soluble chromate, Fe(III) and Ni(II) remain, for the most part, on the metal surface as oxide hydrates.

The oxidation step is a diffusion-controlled process that is limited by the transport of fresh oxidant to the metal surface and can thus break down only a certain oxide layer thickness. When using permanganate, diffusion of the oxidant to the metal surface is additionally slowed down as oxidation time elapses by the formation of manganese dioxide on the surface. As a result, Cr(VI) formation continuously decreases with the treatment time, up to a stabilization of the total amount of chromium dissolved from the oxide layer. Usually, the oxidation step takes several hours and is completed when only a small or no increase in the Cr(VI) concentration can be detected in the oxidation solution.

Reduction Step

In the decontamination method of the present invention, the oxidation step can be optionally followed by a reduction step, in which a reducing agent is introduced into the oxidation solution, and the residual oxidant contained in the oxidation solution and optionally the manganese dioxide in the coolant circuit 12 formed when using permanganate are reduced. For example, an aliphatic dicarboxylic acid, preferably oxalic acid, can be used as a reducing agent.

When using oxalic acid as a reducing agent, the general chemical equations are as follows:

$$2MnO_4^- + 5H_2C_2O_4 + 6H^+ \rightarrow 2Mn^{2+} + 10CO_2 + 8H_2O$$

$$MnO_2 + H_2C_2O_4 + 2H^+ \rightarrow Mn^{2+} + 2CO_2 + 2H_2O$$

The reduction with oxalic acid yields only $CO_2$ and $H_2O$, producing five moles of $CO_2$ per mole of permanganate and two moles of $CO_2$ per mole of manganese dioxide. For example, the $CO_2$ produced in the reduction step can be removed by degassing of the oxidation solution in a surge tank of the external decontamination facility 26 or in a low-pressure area of the coolant circuit 12 and can be fed from here into the operational exhaust air of the nuclear power plant via a corresponding filter.

Preferably, the reducing agent is used in slight excess to ensure the complete reaction of the oxidant. Dissolution of the metal oxide layer does not yet take place in the reduction step.

The reduction step is completed when the concentration of the oxidant does no longer decrease and/or has fallen below a predetermined limit value. Preferably, at the end of the reduction step, the concentration of the oxidant in the oxidation solution is below 5 mg/kg.

The reduction step can be omitted if the oxidation step, by targeted dosing of the oxidant, is controlled such that, at the end of the oxidation step, the concentration of the oxidant is below the desired limit value.

Decontamination Step

In the decontamination step following the oxidation step or optionally the reduction step, the oxide layer on the metal surface treated in the oxidation step is contacted with an organic acid as a decontamination agent to dissolve at least part of the metal oxides and radioactive substances in the primary coolant, generating a decontamination solution.

Preferably, an aliphatic organic acid having up to one acid group per carbon atom is used as an organic acid having up to six carbon atoms. Aliphatic mono- and polycarboxylic acids, especially dicarboxylic acids and tricarboxylic acids, are particularly preferred. Thus, the transition between the reduction step and the decontamination step in the coolant circuit 12 can be fluent. However, the oxidation step and the decontamination step are not intended to be performed simultaneously.

Formic acid or glyoxylic acid and its alkali metal salts can be used as a monocarboxylic acid. The aliphatic polycarboxylic acid is preferably selected from the group of linear aliphatic dicarboxylic acids having 2 to 6 carbon atoms and the aliphatic tricarboxylic acids. In particular, citric acid can be used as an aliphatic tricarboxylic acid.

Aliphatic organic acids having up to six acid groups further comprise C1-C6 sulfonic acids, preferably methyl sulfonic acid. The use of methyl sulfonic acid as a decontamination agent is described in EP 2 787 509 B1.

The organic acids can be used alone or as a mixture.

According to a preferred embodiment the organic acid comprises or consists of oxalic acid.

It is particularly preferred to use an aqueous solution of the organic acid, in particular oxalic acid, having a concentration of 25 to 150 g/L as a concentrate for dosing and add it to the primary coolant, generating the decontamination solution.

When using oxalic acid as a decontamination agent, Cr(VI) is reduced to form Cr(III) and remains in the decontamination solution as an oxalato complex. Ni(III) possibly contained in the oxide layer is reduced to form Ni(II) and passes into solution as an Ni(II) oxalato complex, while iron passes into solution as an anionic Fe(III) oxalato complex. In addition, the decontamination solution also contains the radioactive substances dissolved from the metal oxide layer.

According to the present invention, an oxidant from the group consisting of oxygen, air, hydrogen peroxide and ozone is dosed into the decontamination solution already during the decontamination step. Preferably, the amount of oxidant dosed into the decontamination solution is controlled such that a dissolution rate of the oxide layer predetermined according to the system volume is not exceeded.

It is particularly preferred that dosing of the oxidant into the decontamination solution is controlled such that, during oxidant addition, a dissolution rate of the metal oxide layer of 400 ppm Fe/h, preferably 100 ppm Fe/h, is not exceeded.

Dosing of the oxidant counteracts an oxygen depletion of the decontamination solution that can be recognized by an increase in the Fe(III) concentration of the solution. Thus, according to a preferred embodiment, dosing of the oxidant into the decontamination solution is controlled such that, during oxidant addition, a concentration of Fe(II) in the decontamination solution of 50 ppm is not exceeded.

The dissolution rate of the metal oxide layer is defined as the amount (g) of iron ions entering the unit volume ($m^3$) of the cooling system per time unit (h). For example, the dissolution rate can be determined by sampling and photometric, tritrimetric or spectroscopic measurement of the sample's iron content.

Preferably, the dissolution rate of the metal oxide layer is set according to the available ion exchanger capacity, the system volume and/or the area of the metal surface to be decontaminated. Thus, addition of the oxidant can be controlled such that the amount of oxidant introduced into the decontamination solution per time unit is the larger, the slower the dissolution of the oxide layer is to be performed. This means that the amount of oxidant added per time unit is the larger, the larger the system volume and/or the smaller the available ion exchanger capacity is.

According to another preferred embodiment the addition of oxidant is particularly controlled such that the ratio of the dissolution rate of the metal oxide layer to the purification rate, after the beginning of the oxidant addition, is preferably at most 25 ppm Fe, more preferably at most 20 ppm Fe and even more preferably at most 15 ppm Fe.

When using hydrogen peroxide as an oxidant, the amount of oxidant dosed into the decontamination solution is preferably in a range of between 0.1 and 1.2 L per h per 100 $m^3$ of system volume and particularly preferably between 0.4 and 1.0 L per h per 100 $m^3$ of system volume. Hydrogen peroxide is preferably used as a commercially available 30% aqueous solution.

If gaseous oxidants such as air, oxygen or ozone are used as an oxidant, the oxidant can be introduced into the decontamination solution by means of forced ventilation, for example in a pressure compensation tank or in a spraying facility. To this end, part of the decontamination solution can be diverted from the coolant circuit and saturated with air or oxygen in the pressure compensation tank or the spraying facility. The amount of oxidant introduced into the decontamination solution can be controlled via the volume flow of the decontamination solution diverted from the coolant circuit and returned after saturation with air or oxygen. Furthermore, the gaseous oxidants can also be introduced directly, under pressure, into the coolant at suitable dosing sites in the coolant system, which dramatically increases the solubility of the gases and thus the total amount of oxidant in solution. To this end, for example, the reactor pressure vessel, the pressure compensation tank of the coolant pump or the instrumentation rails in the reactor vessel not utilized during the decontamination treatment are available.

In the case of a direct introduction of the gaseous oxidant into the system, air is less preferred as the inert nitrogen content, in the course of the treatment, can accumulate at various elevated sites of the system as gas cushions and cause insufficient and non-uniform wetting of the surfaces to be decontaminated by the decontamination solution. If the gaseous oxidant is introduced into a large component allowing degassing, as for example into the reactor pressure vessel of a boiling water reactor, there is no such disadvantage, and then air can be used as a preferred oxidant due to its easy availability and safety.

It is particularly preferred that, for any application, oxygen is used as a gaseous oxidant. Oxygen can be employed in a safer and less cumbersome manner than ozone and does not have the disadvantages of the inert nitrogen content of air. Oxygen can be supplied in pressurized gas bottles or generated locally, using suitable equipment, by means of membrane separation methods or other suitable methods, dependent on the demand.

If ozone is employed as a gaseous oxidant, the oxidant content is preferably in a range of between 400 g and 1200 g of ozone per hour per 100 $m^3$ of system volume. Due to the short half-life of ozone in water and the safety-related difficulties occurring during the use of toxic gases in nuclear power plant containment this oxidant is least preferred.

Preferably, during the decontamination step, the oxidant (s) is/are continuously dosed into the decontamination solution. The partial decomposition of the organic acid caused by this is harmless, as it has to be removed again from the decontamination solution later on in any case, with the organic acid used being preferably removed by residue-free decomposition, forming carbon dioxide and water.

Basically, the oxidant can be dosed into the decontamination solution for the entire duration of the decontamination step. Preferably, the oxidant is only dosed into the decontamination solution during part of the duration of the decontamination step, preferably during at least about 50% of the duration, more preferably during at least about 70%, even more preferably during at least about 80% and most preferably during at least about 90% of the duration of the decontamination step.

According to a preferred embodiment dosing of the oxidant into the decontamination solution is performed in a time-delayed manner, only after the beginning of the decontamination step, thus achieving that the dissolution rate of the metal oxide layer is not unnecessarily slowed down in the initial phase of the decontamination step. As the metal ion concentration in the decontamination solution is relatively low in the initial phase of the decontamination step, at this time, a higher dissolution rate can be tolerated without compromising process stability and/or having to worry about formation of a precipitate.

It is particularly preferred that dosing of the oxidant into the decontamination solution starts only after a total iron concentration in the decontamination solution is reached, which van vary, dependent on the available purification rate. Preferably, oxidant dosing starts from a total iron concentration of at least about 20 ppm, preferably about 20 ppm to about 120 ppm and more preferably 40 to 100 ppm.

According to another preferred embodiment dosing of the oxidant in the decontamination step can be controlled by monitoring one or more physical or electrochemical parameters of the decontamination solution. It is particularly preferred that the reduction-oxidation potential, the corrosion potential, the total oxygen content and/or the conductivity of the decontamination solution are monitored. In the case of numeric data, the reduction-oxidation potential denotes the potential difference of the decontamination solution as compared to an Ag/AgCl (sat.) standard reference electrode. The corrosion potential or rest potential denotes the potential difference of the decontamination solution as compared to the metal surface to be decontaminated, also measured in relation to the Ag/AgCl (sat.) standard reference electrode.

The parameters can be monitored by suitable sensors, which are either connected to the power plant's own system control or to an evaluation unit in external temporary equipment, including an external decontamination facility. When exceeding or falling below a predetermined limit value of the respective parameters the amount of oxidant additionally dosed into the decontamination solution can be adjusted to comply with the respective limit value. Moreover, the respective physical or electrochemical parameter can be ascribed empirically to a dissolution rate of the metal oxide layer, which allows the dissolution rate to be indirectly controlled via measuring of the parameters mentioned and kept below the desired limit value.

Preferably, dependent on the materials to be decontaminated, the physical or electrochemical parameters of the decontamination solution are determined such that not only the oxide dissolution rate is controlled within the desired framework but also that the organic acid contained in the decontamination solution cannot cause a base metal attack. This excludes an excessive increase in the metal ion input into the decontamination solution by a base metal attack.

It is particularly preferred that, optionally dependent on the material to be decontaminated, dosing of the oxidant into the decontamination solution is controlled such that a lower limit value for the reduction-oxidation potential and/or the corrosion potential of 0 mV, preferably +50 mV and particularly preferably +100 mV, is not undershot. This ensures that the metal ion input into the decontamination solution occurs with high process stability over a long period of time and that, by dissolving the oxide layer, no more ions are brought into solution than can be removed at large, considering the available ion exchanger flow capacity, and that the metal ions introduced into the decontamination solution are below their respective solubility limit. Thus, it is also ensured that no precipitates form in the decontamination solution.

In addition to monitoring the reduction-oxidation potential and/or the corrosion potential the Fe(II) concentration in the decontamination solution can be monitored and the amount of oxidant dosed into the solution can be controlled such that a Fe(II) concentration of 50 ppm is not exceeded.

Moreover, the reduction-oxidation potential and/or the corrosion potential of the decontamination solution can be used to establish the beginning of the oxidant addition in the decontamination step. Preferably, dosing of the oxidant into the decontamination solution is started as soon as the corrosion potential and/or the reduction-oxidation potential have fallen to a value in a range of 20 to 180 mV, preferably 50 to 150 mV.

Alternatively or additionally, a limit value for the oxygen dissolved in the decontamination solution, starting from which the oxidant is dosed into the decontamination solution, can be set and monitored.

According to the invention, it is further provided that the decontamination solution is passed over an ion exchanger to immobilize the metal ions derived from the dissolution of the metal oxide layer, in particular nickel ions, and the radioactive substances. According to another preferred embodiment of the decontamination method of the present invention the decontamination solution contains both nickel ions and iron ions, and the nickel ions derived from the dissolved metal oxide layer are removed earlier from the decontamination solution than the iron ions.

To this end, the metal ion-containing decontamination solution is passed over a cation exchanger material to bind the metal ions dissolved from the metal oxide layer as well as the manganese derived from the oxidation step and the radioactive substances. Dosing of the oxidant into the decontamination solution causes the iron ions present in the decontamination solution to be largely present in the form of an anionic Fe(III) complex of the organic acid, when using oxalic acid particularly as an anionic Fe(III) oxalato complex, that cannot be bound on a cation exchanger and thus cannot compete with the Ni(II) ions preferably present in the decontamination solution as nickel oxalate for the free binding sites on the cation exchanger.

The decontamination method of the present invention thus ensures that the poorly soluble Ni(II) salt, especially nickel oxalate, is selectively removed from the decontamination solution prior to exceeding the solubility limit of the nickel salt. In contrast, the anionic Fe(III) complex has a very high solubility and can thus remain in the decontamination solution until the subsequent purification step.

Due to the preferred removal of the nickel ions the dissolution rate of the metal oxide layer can be additionally controlled by lowering the process temperature. For example, the decontamination step can be performed at a temperature of 60° C. to 85° C., preferably 60° C. to 80° C., without formation of a precipitate of nickel salts such as nickel oxalate.

Due to the permanent purification of the decontamination solution on ion exchangers, radioactivity is prevented from passing back into the coolant system and an effective reduction of the dose exposure in the current treatment cycle is achieved.

The decontamination step within a treatment cycle is completed when no decrease in the activity of the decontamination solution can be detected.

Purification Step

In the optionally following purification step the organic acid used as a decontamination agent is removed from the decontamination solution which was cleared from radioactive substances. When using oxalic acid as a decontamination agent the oxalic acid can be preferably decomposed by photocatalytic wet oxidation using UV light to form $CO_2$ and water. Less reactive organic acids can be bound on ion exchangers and/or regenerated. In parallel, the decontamination solution is further continuously passed over ion exchangers to remove residual activity and corrosion products. In particular, the Fe(III) complex contained in the decontamination solution is destroyed in this step, binding the Fe(II) ions formed by the reduction of the Fe(III) ions on a cation exchanger. Removal of the organic acid from the decontamination solution serves to prepare the next treatment cycle and ensures the stability of the oxidant employed in the subsequent oxidation step.

At the end of the last treatment cycle, as soon as the desired reduction of the dose rate of the metal surface is achieved, the decontamination solution cleared and freed from the residual decontamination agent is purified, if required, via mixed bed filters until a set conductivity limit is reached.

Exemplary Embodiment

A full system decontamination was performed on a coolant circuit of a nuclear plant with a system volume of about 500 m³ and a system surface of about 25,000 m². The coolant system contained metal surfaces of stainless steel and nickel alloys. The HP-CORD™ process of the company Areva was used, comprising one or more treatment cycles, with an oxidation step using permanganic acid as an oxidant, a decontamination step using oxalic acid as a decontamination agent and a purification step in which the oxalic acid is decomposed by photocatalytic wet oxidation using UV light was performed. The duration of the decontamination step was about 125 h. The temperature of the decontamination solution was set to about 95° C.

Cycle 1 without Oxidant Dosing in the Decontamination Step

In a first treatment cycle about 15 h after the start of the decontamination step a distinct decrease in the oxygen content of the decontamination solution was found that could be recognized by a drop in the corrosion potential to below −100 mV. At the same time, a sharply increased input of iron ions and nickel ions into the decontamination solution was found that could not even be substantially reduced by lowering the temperature of the decontamination solution from 95° C. to about 85° C. By connecting an external decontamination facility with additional ion exchangers a purification rate of about 0.5 was provided. In spite of this, premature exhaustion of the ion exchanger as well as formation of precipitates in the decontamination solution occurred due to the increased metal ion input into the decontamination solution.

Figure 2:
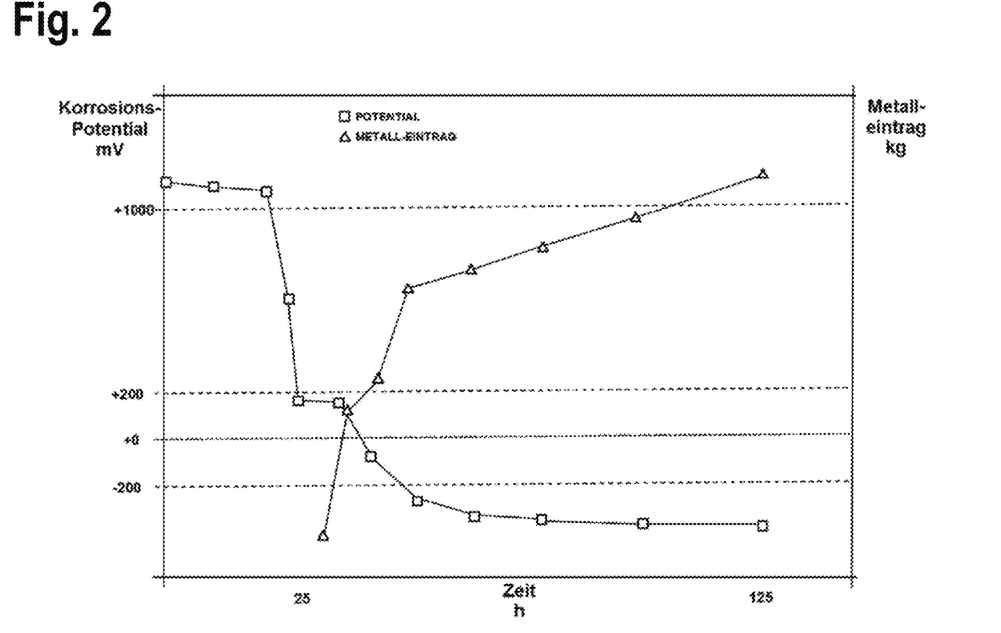
FIG. 2 shows the course of the corrosion potential and the total iron content of the decontamination solution during a treatment cycle without oxidant addition.

FIG. 2 shows the course of the corrosion potential during the first treatment cycle and the total amount of the iron ions released from the metal oxide layer. In the oxidation step during the first 24 hours of the treatment cycle, no iron is discharged from the metal oxide layer into the oxidation solution. As the addition of oxalic acid is started in the decontamination step, the metal oxide layer is dissolved and iron enters the decontamination solution. As a result, the corrosion potential of the decontamination solution decreases to about 120 mV and, after complete consumption of the oxygen present in the decontamination solution, drops to about −350 mV. During the same period substantial amounts of iron ions are released from the metal oxide layer and introduced into the decontamination solution. The dissolution rate of the metal oxide layer is highly increased for a prolonged period of the decontamination step.

Cycle 2 Including Oxidant Dosing in the Decontamination Step

In a second treatment cycle an oxidant was dosed into the decontamination solution in the decontamination step. A 30% hydrogen peroxide solution was used as an oxidant. The oxidant was continuously added at a rate of about 1.5 to 2 liters per hour. The oxidant was added within about 10 hours after the beginning of the decontamination step.

Figure 3:
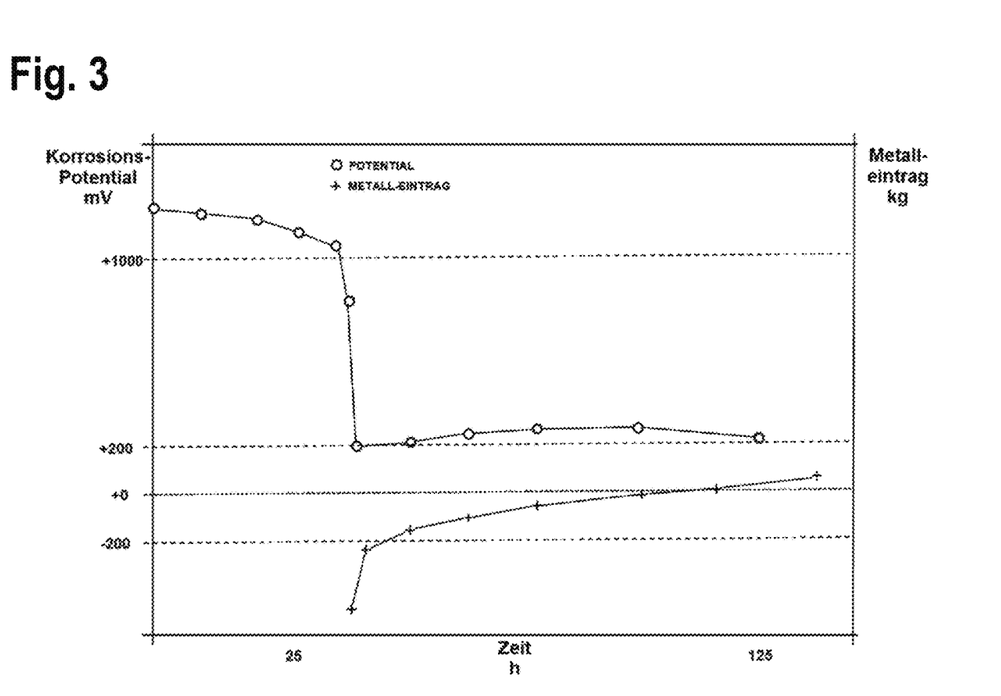
FIG. 3 shows the course of the corrosion potential and the total iron content of the decontamination solution during a treatment cycle with oxidant addition.

FIG. 3 shows the course of the corrosion potential during the second treatment cycle and the total amount of the iron ions released from the metal oxide layer. Even in this cycle no iron ions from the metal oxide layer are introduced into the oxidation solution in the oxidation step during the first 24 hours of the treatment cycle and in the subsequent reduction step. As the addition of oxalic acid is started in the decontamination step, the metal oxide layer is dissolved and iron and nickel enter the decontamination solution. As a result, the corrosion potential of the decontamination solution decreases to about 120 mV. By adding the oxidant to the decontamination solution the corrosion potential is substantially kept at this value. During the same period the dissolution rate of the metal oxide layer drops to a value below 5 ppm iron/h, and the total amount of iron in the decontamination solution slowly increases.

The nickel ions introduced into the decontamination solution simultaneously with the iron ions are continuously removed from the decontamination solution via an ion exchanger. The iron ions are present in the form of a Fe(III) oxalato complex and remain in solution in this phase of the decontamination step. Despite the high system volume a purification rate of 0.1 to 0.3 can be employed, making it possible to rely on ion exchangers exclusively provided by the power plant, and the connection of an external decontamination facility can be renounced.

Measuring the Dissolution Rate of Iron Oxide

Figure 4:
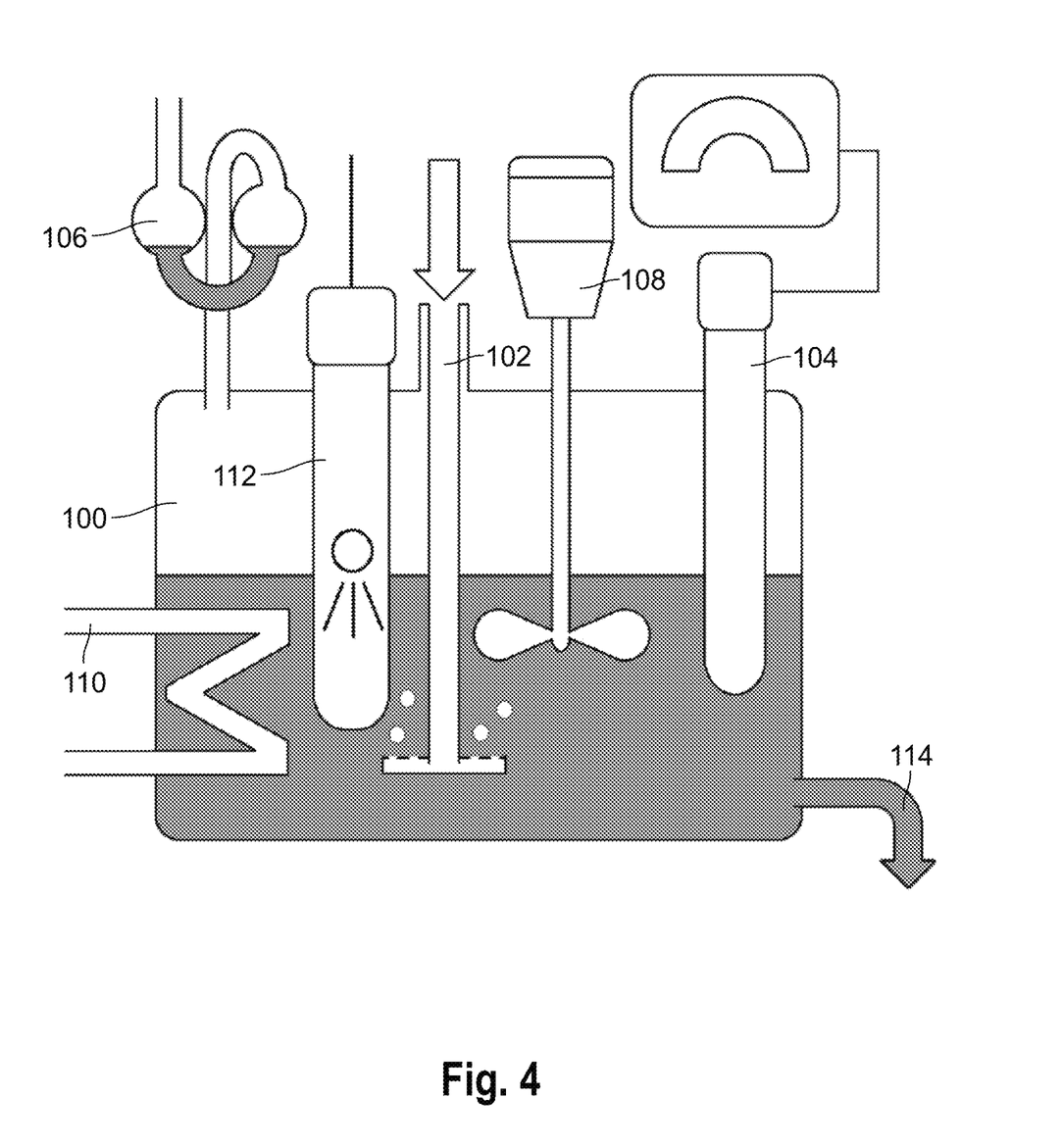
FIG. 4 is a schematic diagram of an experimental setup to measure the dissolution rate of iron oxide in oxalic acid.

FIG. 4 is a schematic diagram of an experimental setup to measure the dissolution rate of iron oxide dependent on the reduction-oxidation potential of an oxalic acid solution. A reaction vessel 100 is equipped with an oxygen inlet 102 for the supply of pure oxygen gas, an electrode array 104, a gas one-way valve 106 for the discharge of gases from the reaction vessel 100, an agitator 108, a temperature control device 110, a UV lamp 112 and an outlet for sampling 114.

5 g/L of hematite powder ($Fe_3O_4$) in completely desalted water is placed in the reaction vessel 100 and continuously circulated by the agitator 108. The temperature of the hematite suspension is set to 85° C. using the temperature control device. Oxalic acid is added to the hematite suspension through an aperture in the reaction vessel 100 intended for the UV lamp 112 and is thus present in a concentration of 2000 ppm. Then, the aperture is closed with the UV lamp. A predetermined reduction-oxidation potential of the hematite suspension is set by the supply of oxygen and/or the operation of the UV lamp, and is controlled and kept constant for the duration of the measurement by means of the electrode array.

At intervals of 0, 5, 10, 15, 30, 45, 60 and 90 minutes samples of 0.5% of the volume of the hematite suspension, were taken and filtered, and the iron content of the solution was determined by means of ICP mass spectroscopy.

The dissolution rate of the hematite at various reduction-oxidation potentials thus determined is shown in Table 1 below.

TABLE 1

| Reduction-oxidation potential [mV] vs. Ag/AgCl (sat.) standard electrode | Hematite dissolution rate ppm Fe/h |
| --- | --- |
| 20 | 302 |
| 40 | 253 |
| 60 | 206 |
| 80 | 164 |
| 100 | 124 |
| 120 | 92 |
| 150 | 57 |
| 180 | 48 |
| 200 | 44 |
| 220 | 42 |

The results show that the dissolution rate of hematite powder in an oxalic acid solution can be widely influenced by setting a predetermined reduction-oxidation potential, and that the dissolution rate of the hematite powder increases as the reduction-oxidation potential of the oxalic acid solution decreases.

The invention claimed is:

1. A method of decontaminating a metal surface, wherein the metal surface is located on a component within a nuclear plant and is covered with a metal oxide layer containing radioactive substances, and wherein the method comprises the following steps:
- a) an oxidation step in which the metal oxide layer is contacted with an aqueous oxidation solution comprising an oxidant;
- b) a decontamination step wherein the metal oxide layer treated in the oxidation step is contacted with an aqueous solution of an organic acid to dissolve the metal oxide layer, thereby forming a decontamination solution that contains the organic acid as well as metal ions and the radioactive substances, and wherein the decontamination solution is passed over an ion exchanger to immobilize the metal ions and the radioactive substances;

wherein in step b) an oxidant selected from the group consisting of oxygen, air, hydrogen peroxide and ozone is dosed into the decontamination solution;

wherein the decontamination solution contains both nickel ions and iron ions and the nickel ions, in the decontamination step, are removed earlier from the decontamination solution than the iron ions; and wherein the decontamination solution is passed over a cation exchanger material, binding the nickel ions on the cation exchanger material, while the iron ions remain in the decontamination solution in the form of an anionic Fe(III) complex.

2. The method according to claim 1, characterized in that, in the decontamination step, only a plant-internal ion exchanger is used.

3. The method according to claim 1, characterized in that oxidant dosing is controlled and monitored exclusively with facilities of the nuclear plant.

4. The method according to claim 1, characterized in that the method is used for large-scale system decontamination.

5. The method according to claim 1, characterized in that the component is located in a coolant system of a nuclear power plant and comprises one or more of the following components: a pipeline for a primary coolant, a reactor pressure vessel, a coolant pump, a steam generator, a pressure reduction facility and/or at least one auxiliary system connected to the coolant system.

6. The method according to claim 1, characterized in that, during the decontamination step, a purification rate is in a range of between 0.1 h-1 and 0.7 h-1, the purification rate being defined as a ratio of a flow capacity of the ion exchanger to volume of a system to be decontaminated.

7. The method according to claim 1, characterized in that dosing of the oxidant into the decontamination solution is controlled such that a dissolution rate of the metal oxide layer of 400 ppm Fe/h is not exceeded.

8. The method according to claim 1, characterized in that dosing of the oxidant into the decontamination solution is controlled such that a concentration of Fe(II) ions in the decontamination solution of 50 ppm is not exceeded.

9. The method according to claim 1, characterized in that dosing of the oxidant into the decontamination solution is controlled dependent on available flow capacity of the ion exchanger, system volume and area of the metal surface to be decontaminated.

10. The method according to claim 1, characterized in that dosing of the oxidant into the decontamination solution is controlled such that a ratio of a dissolution rate of the metal oxide layer to a purification rate is at most 25 ppm Fe, the purification rate being defined as the ratio of a flow capacity (m3/h) of the ion exchanger to a volume (m3) of a system to be decontaminated.

11. The method according to claim 1, characterized in that hydrogen peroxide is used as an oxidant and dosed into the decontamination solution in an amount of between 0.1 and 1 L per h per 100 m3 of system volume.

12. The method according to claim 1, characterized in that air, oxygen or ozone is used as an oxidant and that the oxidant is dosed by forced ventilation of a proportion of the decontamination solution.

13. The method according to claim 1, characterized in that air, oxygen or ozone is directly introduced into the decontamination solution under pressure.

14. The method according to claim 1, characterized in that the oxidant is continuously dosed into the decontamination solution.

15. The method according to claim 1, characterized in that the oxidant is dosed into the decontamination solution in a time-delayed manner after a beginning of the decontamination step.

16. The method according to claim 1, characterized in that dosing of the oxidant into the decontamination solution is controlled by monitoring one or more physical and/or electrochemical parameters of the decontamination solution.

17. The method according to claim 16, characterized in that a reduction-oxidation potential, a corrosion potential, a conductivity and/or a total oxygen content of the decontamination solution are monitored and used to control the dosing of the oxidant.

18. The method according to claim 17, characterized in that the reduction-oxidation potential and/or the corrosion potential are set such that the organic acid cannot cause a base metal attack on the metal surface.

19. The method according to claim 17, characterized in that oxidant dosing is controlled such that a limit value for the corrosion potential and/or the reduction-oxidation potential of the decontamination solution of 0 mV is not undershot.

20. The method according to claim 17, characterized in that dosing of the oxidant into the decontamination solution begins as soon as the corrosion potential and/or the reduction-oxidation potential of the decontamination solution has dropped to a value in a range from 20 to 180 mV.

21. The method according to claim 1, characterized in that the decontamination step is followed by a purification step in which the organic acid contained in the decontamination solution is removed and optionally decomposed, with the oxidation step, the decontamination step and the purification step being optionally repeated.

22. The method according to claim 1, wherein the metal surface is located on a component within a coolant system of a nuclear power plant.

23. The method according to claim 4, characterized in that the method is used for full system decontamination.

24. The method according to claim 22, characterized in that, during the decontamination step, a purification rate is in a range of between 0.1 h-1 and 0.7 h-1, the purification rate being defined as a ratio of a flow capacity of the ion exchanger to volume of the coolant system to be decontaminated.

25. The method according to claim 22, characterized in that air, oxygen or ozone is used as an oxidant and that the oxidant is dosed by forced ventilation of a proportion of the decontamination solution diverted from the coolant system.

26. The method according to claim 15, characterized in that the dosing of the oxidant begins after the decontamination solution has reached a total iron concentration of at least 20 ppm.

* * * * *